G. W. N. YOST & R. D. WARNER.
Mower.
No. 209,846. Patented Nov. 12, 1878.
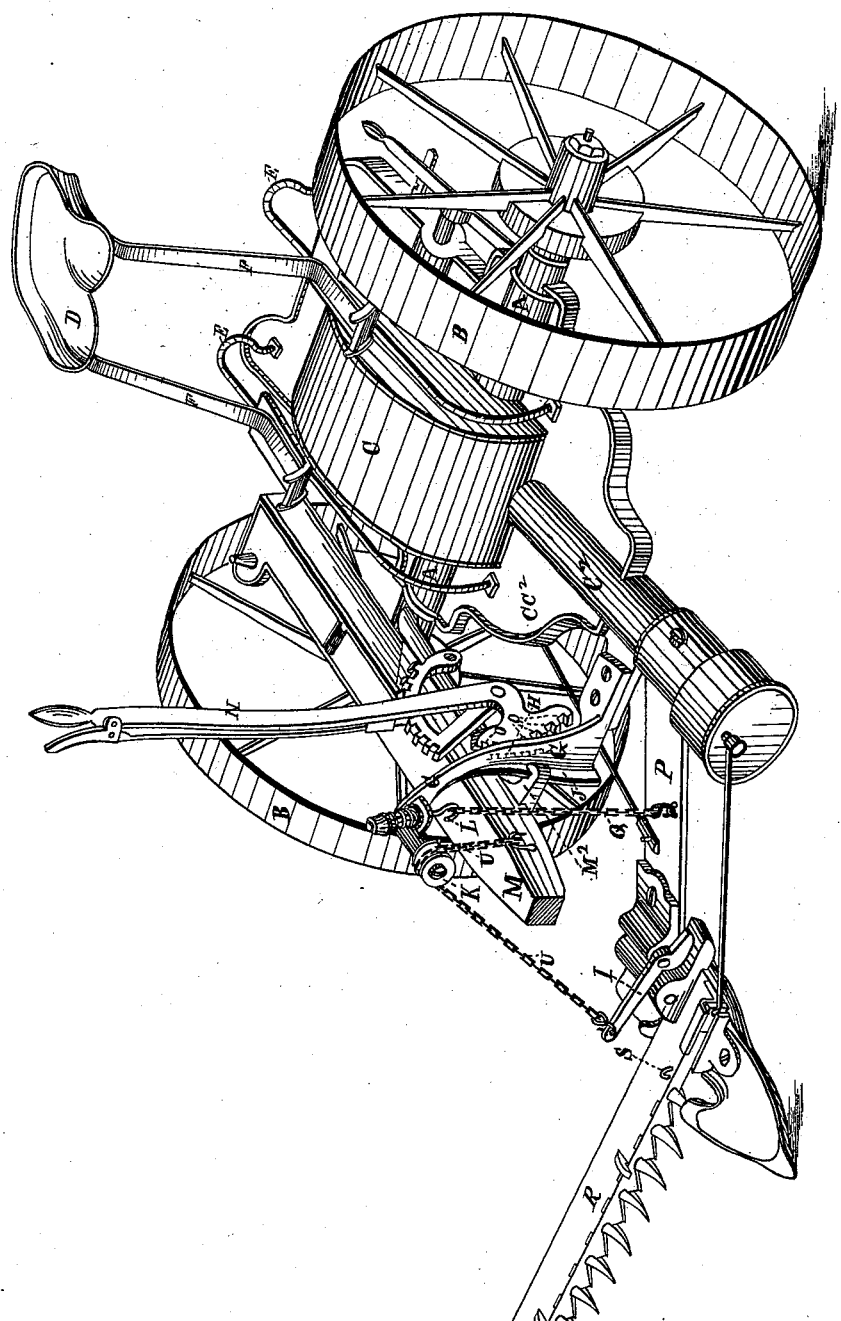

UNITED STATES PATENT OFFICE.

GEORGE W. N. YOST, OF NEW YORK, AND ROBERT D. WARNER, OF SYRACUSE, N. Y.

IMPROVEMENT IN MOWERS.

Specification forming part of Letters Patent No. 209,846, dated November 12, 1878; application filed August 14, 1875.

*To all whom it may concern:*

Be it known that we, GEORGE W. N. YOST, of the city and State of New York, and ROBERT D. WARNER, of the city of Syracuse and State of New York, have invented Improvements in Mowing-Machines, of which the following is a specification:

The invention relates to the finger-bar-lifting device of a front-cutting adjustable main-frame mowing-machine; and its nature is as follows: in combining a lifting-lever connected both with the draft-tongue and adjustable main frame of a front-cutting mowing-machine with a lifting chain attached to such draft-tongue, and extended around and over a pulley on the upper end of a horn on and up from the fore part of such main frame, and attached to the finger-bar; in combining a lifting-lever connected both with the draft-tongue and adjustable main frame of a front-cutting mowing-machine with a lifting-chain attached to such draft-tongue, and extended around and over a pulley on the upper end of a horn on and up from the fore part of such main frame, and attached to a tilting-lever pivoted to the outer end of the coupling-arm, and working on the inner end of the finger-bar; and in combining the adjustable main frame of a front-cutting mowing-machine, provided with an adjustable seat on the hind end behind the main axle, and with a horn on and up from the fore part, with a lifting-lever connected both with the draft-tongue and such main frame, and with a lifting-chain attached to such draft-tongue, and extended around and over a pulley on the upper end of such horn, and connected with the finger-bar.

The accompanying drawing and following description fully illustrate the invention.

The drawing represents a perspective front view of a mowing-machine.

The description is as follows: A represents the main axle of a mowing-machine; B, a traveling driving-wheel loosely on each end of the main axle A; C, the hollow box-like part of the main frame loosely on the main axle A; C², the neck or fore part of the main frame, attached to the box-like part C forward of the main axle A; D, the operator's seat attached to the hind end of the main frame C C² behind the main axle A; E, a rod attached to each side of the hind end of the main frame C C², and extended horizontally hindward; F, a spring attached to the operator's seat D, and loosely over each main-frame rod E; G, a horn attached to one side of the main-frame neck C², and extended upward and bent over a little outward therefrom; H, a series of cogs in the arc of a circle on the horn G, on the side next the main axle A; J, a vertical rib up and down on the edge of the horn G, on the side opposite the cogs H; K, a pulley on the upper end of the vertical horn G; L, a hook on the upper end of the vertical horn G; M, a draft-tongue loosely on the main axle A, at the side of the main-frame box C, and extended forward parallel with the main-frame neck C²; M², a rabbeted lug on the draft-tongue M, on the side next the main frame C C², and adapted to receive and work over the rib J of the vertical horn G; N, a vertical lifting-lever, pivoted to the draft-tongue M on the side next the main frame C C²; O, a series of cogs on the arc of a circle on the lower end of the lifting-lever N, and adapted to work in the cogs H of the vertical horn G; P, a coupling-arm attached to the fore end of the main frame C C², and extended horizontally at a right angle; Q, a connecting-chain attached to the coupling-arm P, and to the hook L on the upper end of the vertical horn G; R, a finger-bar hinged to the outer end of the coupling-arm P; S, a hook or link on the finger-bar R near the inner end; T, a tilting-lever hinged on and near the outer end of the coupling-arm P, and extended over so as to work on the inner end of the finger-bar R; and U, a lifting-chain attached to the draft-tongue M, and extended around and over the pulley K on the upper end of the vertical horn G, and connected with the finger-bar R.

The operation is as follows: In the normal position, at work, the fore end of the main frame C C² and the coupling-arm P are near the ground, and the upper end of the lifting-lever N is in a vertical position. The operator's seat D is adjusted on the rods E so that the weight of the operator in the seat will counterbalance the weight of the fore end of the draft-tongue M on the necks of the team.

Then pulling the upper end of the lifting-lever N backward and downward will lift the fore end of the main frame C C² parallel or nearly parallel with the draft-tongue; and as the fore end of the main frame rises the vertical horn G will lift the middle of the lifting-chain U, and thereby lift up the outer end of the finger-bar R, and, also, as the fore end of the main frame rises, the hind end falls downward on a circle, and throws the weight of the operator in the seat farther from the pivot or fulcrum, sufficiently to counterbalance the increased weight of the finger-bar thus thrown on the draft-tongue, so that no increased weight is thrown on the necks of the team. Therefore,

What we claim is as follows:

1. The combination of an adjustable main frame of a mowing-machine, provided with an operator's seat behind the main axle, and with an upward-extended horn on the fore end, with a lifting-lever connected with the draft-tongue and such main frame, and with a lifting-chain attached to such draft-tongue, and extended around and over a pulley on the upper end of such horn, and connected with the finger-bar, substantially as described.

2. The combination of a lifting-lever, connected with both the adjustable main frame and draft-tongue of a mowing-machine, with a lifting-chain attached to such draft-tongue, and extended around and over a pulley on the upper end of a vertical horn on the fore end of such main frame, and connected with the finger-bar, substantially as described.

3. The combination of a lifting-lever, connected with both the adjustable main frame and draft-tongue of a mowing-machine, with a lifting-chain attached to such draft-tongue, and extended around and over a pulley on the upper end of a vertical horn on the fore end of such main frame, and attached to a tilting-lever pivoted so as to rest and work on the inner end of the finger-bar, substantially as described.

GEORGE W. N. YOST.
R. D. WARNER.

Witnesses:
JAMES DENSMORE,
EDMUND MASSON.